(12) United States Patent
Li

(10) Patent No.: US 11,775,085 B2
(45) Date of Patent: Oct. 3, 2023

(54) STYLUS TIP STRUCTURE, AND PASSIVE CAPACITIVE STYLUS

(71) Applicant: SHENZHEN HITEVISION TECHNOLOGY CO., LTD., Guangdong (CN)

(72) Inventor: Donggui Li, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/908,927

(22) PCT Filed: Sep. 8, 2020

(86) PCT No.: PCT/CN2020/114026
§ 371 (c)(1),
(2) Date: Sep. 2, 2022

(87) PCT Pub. No.: WO2021/174799
PCT Pub. Date: Sep. 10, 2021

(65) Prior Publication Data
US 2023/0103845 A1 Apr. 6, 2023

(30) Foreign Application Priority Data

Mar. 4, 2020 (CN) .......................... 202010143995.2

(51) Int. Cl.
*G06F 3/0354* (2013.01)
*G06F 3/044* (2006.01)

(52) U.S. Cl.
CPC .............................. *G06F 3/03545* (2013.01)

(58) Field of Classification Search
USPC ...................................................... 345/179
See application file for complete search history.

(56) References Cited

U.S. PATENT DOCUMENTS 5,756,886 A * 5/1998 Nishimura ............. G01B 5/016
33/561
6,066,125 A * 5/2000 Webster, Jr. ....... A61M 25/0136
604/95.04
(Continued)

FOREIGN PATENT DOCUMENTS

CN 203799342 U 8/2014
CN 109117006 A 1/2019
(Continued)

OTHER PUBLICATIONS

PCT International Search Report for PCT/CN2020/114026, dated Nov. 30, 2020, 10 pages.
(Continued)

*Primary Examiner* — Chineyere D Wills-Burns
(74) *Attorney, Agent, or Firm* — East IP P.C.

(57) ABSTRACT

A stylus tip structure and a passive capacitive stylus. The stylus tip structure comprises a main body and an embedded member. The main body has a hollow structure, and multiple through holes are provided in the main body. The embedded member comprises multiple contacts and a connection arm. The contacts are arranged to correspond to the through holes. The connection arm is provided within an internal cavity of the main body. The multiple contacts are connected by the connection arm as an elastic integrated structure. Structures of the contacts are partially exposed from the main body via the through holes. When a user uses a passive capacitive stylus having the stylus tip structure to write, the contacts exposed from the main body are in contact with a glass surface of a capacitive touch panel.

18 Claims, 4 Drawing Sheets

(56) References Cited

U.S. PATENT DOCUMENTS

| | | | | |
|---|---|---|---|---|
| 2009/0277697 A1* | 11/2009 | Bolt | ........................ | G06F 3/147 |
| | | | | 178/19.01 |
| 2013/0038579 A1* | 2/2013 | Boyd | ....................... | B43K 1/00 |
| | | | | 345/179 |
| 2014/0062968 A1* | 3/2014 | Skinner | ............... | G06F 3/03545 |
| | | | | 345/179 |
| 2015/0091880 A1* | 4/2015 | Lee | .................... | G06F 3/03545 |
| | | | | 345/179 |
| 2016/0299584 A1* | 10/2016 | Clark | ................. | G06F 3/03545 |

FOREIGN PATENT DOCUMENTS

| | | | |
|---|---|---|---|
| CN | 109445637 | A | 3/2019 |
| CN | 110045842 | A | 7/2019 |
| CN | 111352512 | A | 6/2020 |
| WO | 2012036402 | A2 | 3/2012 |

OTHER PUBLICATIONS

The First Office Action for CN Application No. 202010143995.2, dated Feb. 20, 2021, 6 pages.

\* cited by examiner

STYLUS TIP STRUCTURE, AND PASSIVE CAPACITIVE STYLUS

CROSS-REFERENCE TO RELATED APPLICATION

This application is a national phase of PCT Application No. PCT/CN2020/114026, which was filed on Sep. 8, 2020 and claims priority to Chinese Patent Application No. 202010143995.2, filed on Mar. 4, 2020 and titled "PASSIVE CAPACITIVE STYLUS AND STYLUS TIP STRUCTURE", both of which are hereby incorporated by reference in their entireties.

TECHNICAL FIELD

The present disclosure relates to the technical field of capacitive touch, in particular to a stylus tip structure and a passive capacitive stylus.

BACKGROUND

The descriptions herein merely provide background information related to the present application, and are not necessarily prior art. Currently, a tip of a passive capacitive stylus is generally made of conductive rubber and conductive plastic, the electrical conductivity of the conductive rubber can meet the requirements, but the frictional resistance between the conductive rubber and the glass is too large, and the writing is not smooth enough; the conductive plastic is too hard to generate deformation, and if the tip is made to have a round head, a contact area is not sufficient, and the amount of electrical signal is insufficient, resulting in the problem of touch recognition failure; if the tip is made to have a flat surface, the stylus may be damaged when a full-plane contact of the tip cannot be maintained during writing.

SUMMARY

Technical Problem

One of objectives of the embodiments of the present application is to provide a stylus tip structure and a passive capacitive stylus, which intend to solve the problem that the electrical conductivity and writing smoothness cannot be ensured at the same time in the stylus tip structure of the prior art.

Technical Solutions

To solve the above technical problems, the embodiments of the present application adopt the technical solutions as below.

On one aspect, a stylus tip structure is provided, the stylus tip structure includes:
  a stylus tip body, formed as a hollow member and provided with a plurality of through holes; and
  an embedded member, including a plurality of contacts and connecting arms each connected to adjacent two contacts, the contacts being arranged corresponding to the through holes, the connecting arms being arranged in an inner cavity of the stylus tip body, the plurality of contacts being connected through the connecting arms to form an elastic integral structure, and a portion of each of the contacts being exposed out of the stylus tip body through the through hole.

In an embodiment, the exposed portion of the contact at least partially protrudes out of an outer surface of the stylus tip body.

In an embodiment, the exposed portion of the contact is at least partially coplanar with an outer surface of the stylus tip body.

In an embodiment, the stylus tip body includes an end surface portion and a side wall portion, each of the end surface portion and the side wall portion is provided with a plurality of the through holes.

In an embodiment, an outer surface of the end surface portion is formed as a spherical surface, an outer surface of the side wall portion is formed as a tapered surface, the diameter of the tapered surface gradually decreases in a direction closing to the end surface portion, and the spherical surface and the tapered surface are connected in a smooth transition.

In an embodiment, the diameter of the side wall portion is in a range of 6 mm-10 mm, and the diameter of a connecting portion between the side wall portion and the end surface portion is in a range of 4 mm-6 mm, so that the diameter of the contact surface between the stylus tip body and the glass surface of a capacitive touch panel is in a range of 6 mm-8 mm.

In an embodiment, the connecting arms include a first connecting arm, and a plurality of contacts and a plurality of the first connecting arms form a plurality of elastic strips, each elastic strip is spirally extended, and in each elastic strip, adjacent contacts are connected by the first connecting arm.

In an embodiment, the respective elastic strips are arranged in an annular shape; the connecting arms further include a plurality of second connecting arms corresponding to the plurality of elastic strips respectively, and the contacts, located at one ends of the respective elastic strips close to the center of the annular shape, are connected with one ends of the respective second connecting arms.

In an embodiment, the other ends of the plurality of the second connecting arms corresponding to the plurality of the elastic strips are directly connected together.

In an embodiment, one contact is provided at the central position of the annular shape, and the other ends of the plurality of second connecting arms corresponding to the plurality of elastic strips are all connected to the one contact.

In an embodiment, the contact is formed as a columnar structure, and the end surface and the side surface of the columnar structure are transitionally connected by a smooth curved surface.

In an embodiment, the end surface of the columnar structure is parallel to the outer surface of the stylus tip body where the contact is located.

In an embodiment, the end surface and at least part of the smooth curved surface of the columnar structure are exposed out of the stylus tip body.

In an embodiment, the stylus tip body and the contacts are made of different materials.

In an embodiment, the stylus tip body is made of conductive silicone, and the contacts are made of conductive plastic.

In an embodiment, a portion of the contact for contacting a glass surface is formed as a round head, the diameter of the round head is in a range of 1 mm-1.5 mm, and the distance between two round heads of adjacent two contacts is in a range of 0.8 mm-1.2 mm.

In an embodiment, the dimension of the round head protruding out of an outer surface of the stylus tip body is less than or equal to 0.2 mm.

On a second aspect, a passive capacitive stylus is provided, which includes the stylus tip structure for the passive capacitive stylus as described above.

DESCRIPTION OF THE DRAWINGS

In order to illustrate the technical solutions in the embodiments of the present application more clearly, the accompanying drawings that are used in the description of the embodiments or exemplary technologies below are briefly introduced; obviously, the accompanying drawings in the following description are merely some embodiments of the present application, and for the person skilled in the art, other accompanying drawings can be obtained according to these accompanying drawings without expending any creative effort.

Figure 1:
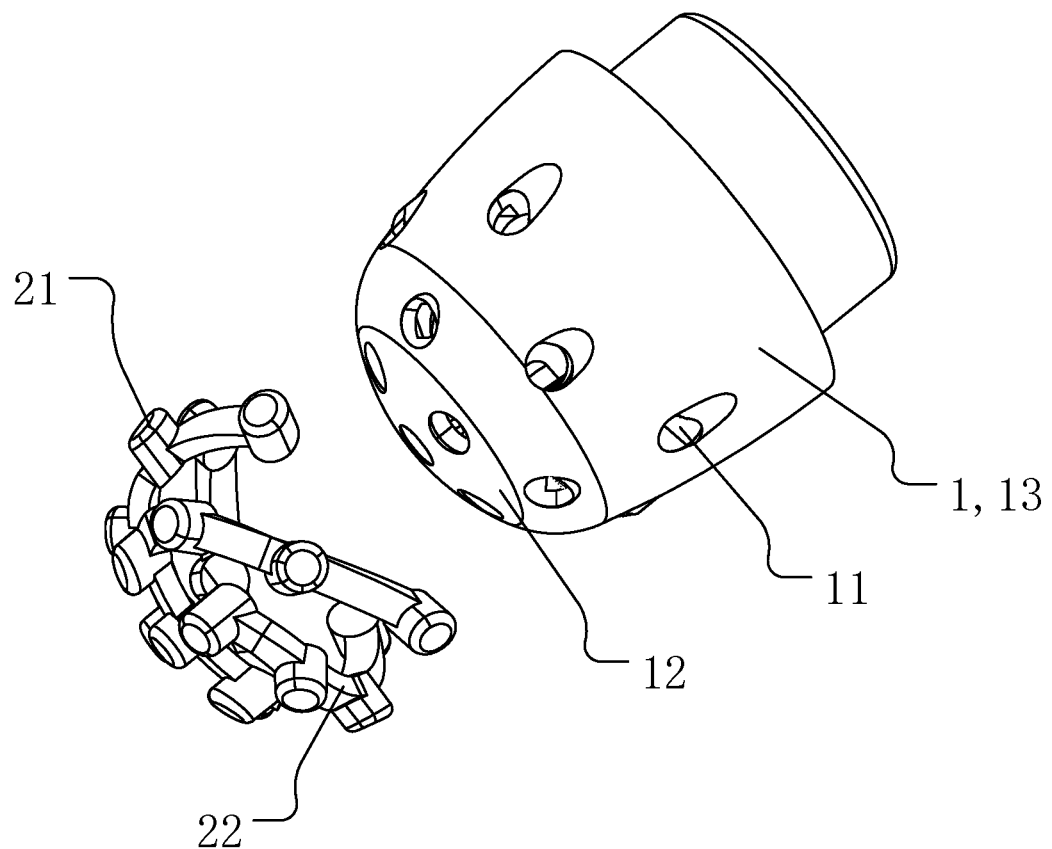
FIG. 1 is an exploded schematic diagram of a stylus tip structure provided by an embodiment of the present application.

REFERENCE NUMERALS IN THE DRAWINGS 1, stylus tip body; 11, through hole; 12, end surface portion; 13, side wall portion; 14, inner cavity; 2, embedded member; 21, contact; 211, round head; 212, side surface; 213, end surface; 22, connecting arm; 221, first connecting arm; 222, second connecting arm.

DETAILED DESCRIPTION

In order to make the objectives, technical solutions and advantages of the present application more clear, the present application will be described in further detail below with reference to the accompanying drawings and embodiments. It should be understood that the specific embodiments described herein are only used to explain the present application, but not to limit the present application.

It should be noted that when a component is referred to as being "fixed to" or "disposed on" another component, it can be directly located on another component or indirectly located on another component. When a component is referred to as being "connected to" another component, it can be directly or indirectly connected to another component. The orientation or positional relationship indicated by the terms "upper", "lower", "left", "right", or the like is based on the orientation or positional relationship shown in the accompanying drawings, is only for the convenience of description, rather than indicating or implying that the referred device or element must have the specific orientation, be constructed and operated in the specific orientation, and thus cannot be construed as a limitation to the present application; and the person skilled in the art can understand the specific meanings of the above terms according to specific situations. The terms "first" and "second" are only used for the purpose of description, and should not be understood as indicating or implying relative importance or implicitly indicating the number of technical features. "A plurality of" means two or more, unless expressly and specifically limited otherwise.

In order to illustrate the technical solutions provided by the present application, the following detailed description is given in combination with the specific accompanying drawings and embodiments.

Figure 2:
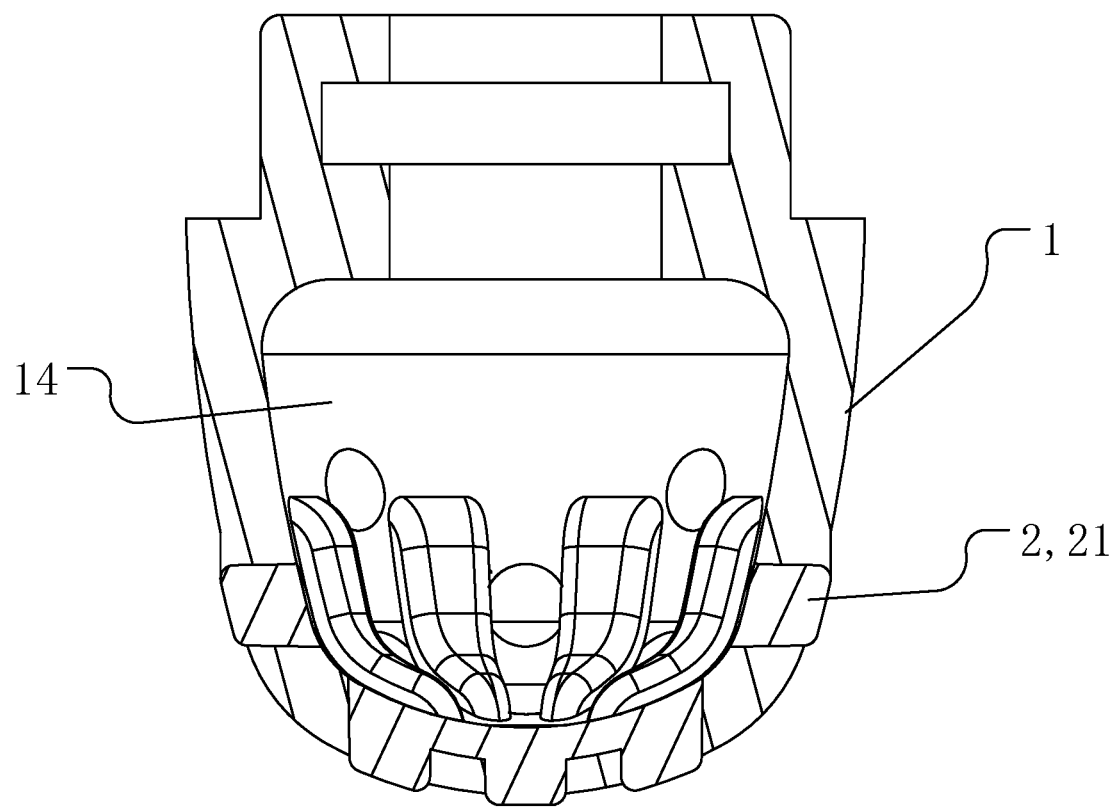
FIG. 2 is a cross-sectional view of a stylus tip structure provided by an embodiment of the present application.

Some embodiments of the present application provide a stylus tip structure. Referring to FIG. 1 and FIG. 2, the stylus tip structure is made of electric conductive material and includes a stylus tip body 1 and an embedded member 2. The stylus tip body 1 is formed as a hollow member, and is provided with a plurality of through holes 11. The embedded member 2 includes a plurality of contacts 21 and connecting arms 22 each connected to adjacent two contacts 21, the contacts 21 are arranged corresponding to the through holes 11, the connecting arms 22 are arranged in an inner cavity 14 of the stylus tip body 1, the plurality of contacts 21 are connected through the connecting arms 22 to form an elastic integral structure, and a portion of each contact 21 is exposed out of the stylus tip body 1 through the through hole 11. When the contacts 21 protrude out of the stylus tip body 1, it is more convenient for the contacts 21 to contact the glass surface of a capacitive touch panel.

In the stylus tip structure of the present application, the connecting arms 22 are used to connect the plurality of contacts 21 into an elastic integral structure, when the user writes with the passive capacitive stylus, the contacts 21 exposed out of the stylus tip body 1 come into contact with the glass surface of the capacitive touch panel, and since the integral structure constituted by the contacts 21 and the connecting arms 22 is elastic, the contact frictional force during writing can be reduced by means of the elastic deformation of the integral structure, the sufficient contact area also can be ensured, so as to obtain sufficient amount of electrical signals and thus improve writing feel and writing smoothness.

In one embodiment, the exposed portion of the contact 21 at least partially protrudes beyond an outer surface of the stylus tip body 1, so that the portion of the contact 21 exposed out of the stylus tip body 1 is in contact with the glass surface. Certainly, in other embodiments, the exposed portion of the contact 21 is at least partially coplanar with the outer surface of the stylus tip body 1, thereby ensuring sufficient contact of the contact 21 with the glass surface during writing.

It should be noted that the contacts 21 and the stylus tip body 1 can be made of the same material, such as conductive rubber, conductive plastic or conductive silicone, and in this case, the friction of the contacts 21 with the glass surface of the capacitive touch panel is reduced mainly by the elasticity of the connecting arms 21, and meanwhile, wear can be reduced to a certain extent.

Certainly, the contacts 21 and the stylus tip body 1 can be made of different materials, wherein the contacts 21 are made of hard conductive adhesive, such as conductive plastic; the conductive plastic is relatively hard, and thus by contacting with the glass surface during writing, it can further reduce the contact frictional force of writing and improve the writing feel; and the conductive plastic has good wear resistance and self-lubrication, and thus has a long service life. Meanwhile, the integral structure constituted by the contacts 21 and the connecting arms 22 is elastic, can be elastically deformed and not rigid, and thus can be elastically deformed and restored relatively freely when the stylus tip is pressed, thereby achieving a good writing effect.

Specifically, the stylus tip body 1 is made of soft conductive adhesive, such as conductive silicone, so that the stylus tip body 1 can also be deformed during writing, thereby further improving the writing effect.

The above-mentioned conductive plastic includes conductive PC (polycarbonate), conductive nylon, conductive POM (polyformaldehyde) and other plastic materials formed by adding conductive powder, and conductive Teflon.

In the present embodiment, the conductive silicone uses the conductive Teflon, the conductive Teflon has better wear resistance and lower frictional resistance with the glass surface, and thus can improve the wear resistance and writing smoothness of the contacts. The above-mentioned conductive silicone is also formed by adding conductive powder to the silicone material, and its impedance value is not greater than 20 MΩ to ensure the electrical conductivity.

Figure 4:
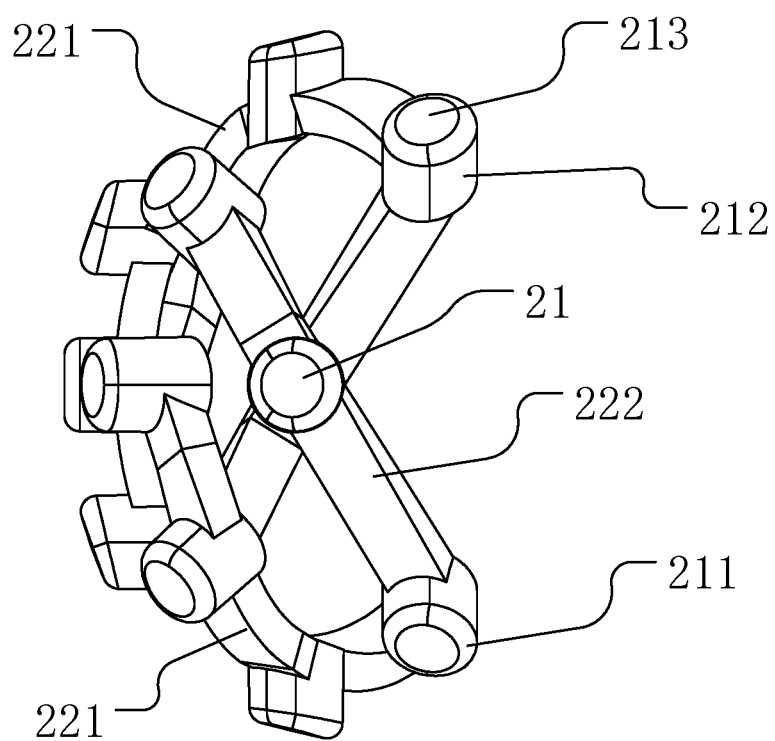
FIG. 4 is a schematic structural diagram of an embedded member of a stylus tip structure provided by the embodiment of the present application from another perspective.

In the present embodiment, specifically referring to FIG. 4, a portion of the conductive plastic contact 21 for contacting the glass surface is formed as a round head 211, which has a diameter in a range of 1 mm-1.5 mm, the distance between two round heads 211 of adjacent two contacts 21 is in a range of 0.8 mm-1.2 mm, and optionally the distance is 1 mm, so as to ensure the amount of contacts 21 in the stylus tip structure, and also ensure good electrical conductivity and writing smoothness.

Specifically, the dimension of the round head 211 protruding out of the outer surface of the stylus tip body 1 is less than or equal to 0.2 mm, so as to ensure that when writing, both the stylus tip body of conductive silicone and the contacts of conductive plastic can come into contact with the glass surface, and further to ensure sufficient contact area, good electrical conductivity and writing smoothness.

In one embodiment of the present application, referring to FIG. 1 and FIG. 2, the stylus tip body 1 includes an end surface portion 12 and a side wall portion 13, and each of the end surface portion 12 and the side wall portion 13 is provided with a plurality of through holes 11, so as to ensure sufficient contacts 21 and further to ensure good electrical conductivity and writing smoothness.

Specifically, in the present embodiment, an outer surface of the end surface portion 12 is formed as a spherical surface, an outer surface of the side wall portion 13 is formed as a tapered surface, the diameter of the tapered surface gradually decreases in a direction closing to the end surface portion 12, and the spherical surface and the tapered surface are connected in a smooth transition, so as to ensure sufficient contact between the elastic stylus tip structure and the glass surface when writing, and also ensure good electrical conductivity.

For this purpose, in an embodiment of the present application, referring to FIG. 1 to FIG. 4, the diameter d1 of the side wall portion 13 of the stylus tip body 1 is in a range of 6 mm-10 mm, such as 6 mm, 7 mm, 9 mm, 10 mm, and the like, and the diameter d2 of the portion between the end surface portion 12 and the side wall portion 13 is in a range of 4 mm-6 mm, such as 4 mm, 4.5 mm, 5 mm, 5.7 mm, 6 mm, and the like, so that the contact surface between the stylus tip body 1 and the glass surface formed by the deformation of the conductive silicone during writing, may be approximately a circle with a diameter of 6 mm-8 mm, thereby generating sufficient contact area and thus better ensuring sufficient electrical signals; and meanwhile, the writing smoothness of the passive capacitive stylus can be ensured under a suitable contact area.

In an embodiment of the present application, specifically referring to FIG. 1 to FIG. 4, the contact 21 is formed as a columnar structure, the end surface 213 of which is exposed out of the stylus tip body 1, and the end surface 213 and the side surface 212 of the columnar structure are connected in a transitional manner by a smooth curved surface, so as to facilitate the contact 21 to pass through the through hole 11, thereby facilitating the movement of the contact 21 relative to the stylus tip body 1 and improving smoothness of the writing.

Specifically, in the present embodiment, the end surface 213 of the columnar structure is parallel to the outer surface of the stylus tip body 1 where the contact 21 is located, so as to better ensure the sufficient contact between the end surface 213 of the contact 21 and the glass surface during writing, and thus ensure the electrical conductivity.

Certainly, in some other embodiments, the end surface 213 and at least part of the smooth curved surface of the columnar structure are exposed out of the stylus tip body 1, so as to ensure that the part of the contact 21 exposed out of the stylus tip body 1 is in contact with the glass surface when writing; since the integral structure formed by the contacts 21 and the connecting arms 22 is elastic and the contacts 21 are made of conductive plastic, the contact frictional force during writing can be better reduced, and the writing feel can be improved.

Figure 3:
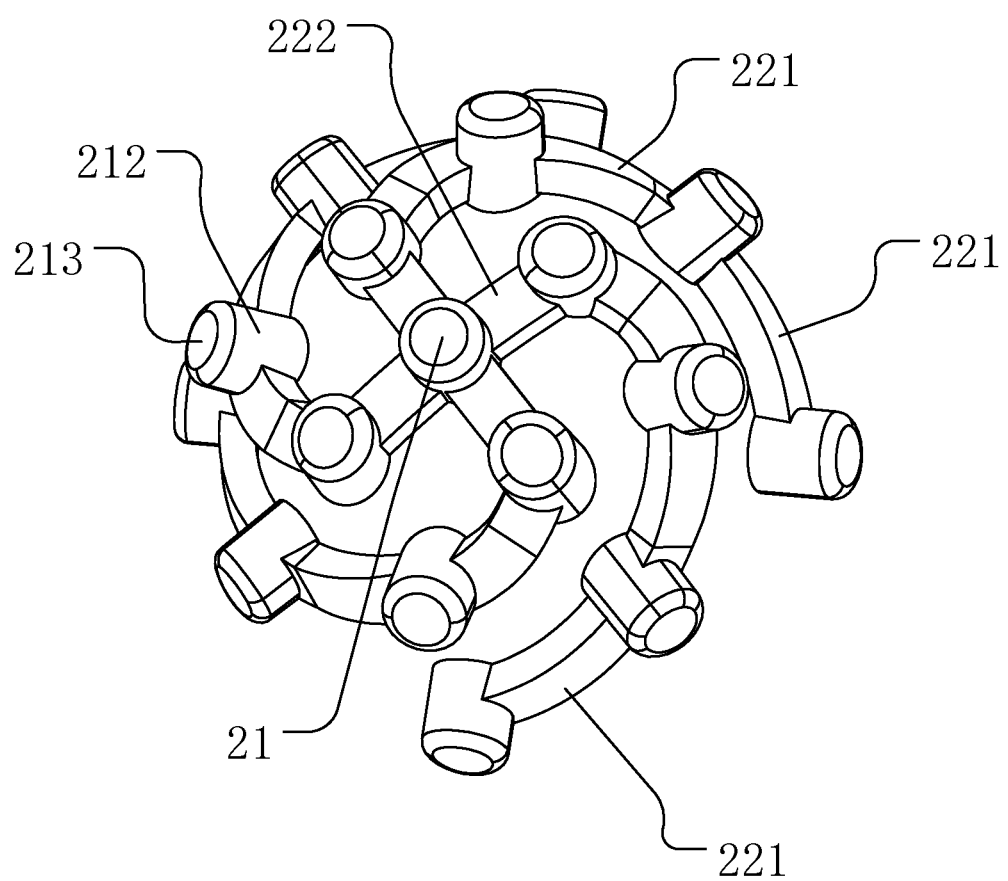
FIG. 3 is a schematic structural diagram of an embedded member of a stylus tip structure provided by an embodiment of the present application from a perspective view.

In an embodiment of the present application, specifically referring to FIG. 3 and FIG. 4, the connecting arms 22 include a first connecting arm 221, a plurality of contacts 21 and a plurality of first connecting arms 221 form a plurality of elastic strips, and each elastic strip is spirally extended, wherein in each elastic strip, adjacent contacts 21 are connected by the first connecting arm 221, that is, the elastic strip includes at least two said contacts 21 spaced apart along an extending direction of the elastic strip 21, and the adjacent contacts 21 on the same elastic strip are connected through the first connecting arm 221. The spiral elastic strip makes the integral structure constituted by the connecting arms 22 and the contacts 21 more elastic, just like a compression spring, and the integral structure can produce elastic deformation and recovery more freely, thereby achieving a better writing effect.

In an embodiment of the present application, specifically referring to FIG. 3 and FIG. 4, the respective elastic strips are arranged in an annular shape, and when the side wall portion 13 is formed as a tapered surface, the center of the annular shape is located on the axis of the tapered surface, that is, the respective elastic strips are arranged annularly around the central line where the axis of the tapered surface is located, and the connecting arms 22 further include a plurality of second connecting arms 222 corresponding to the plurality of elastic strips respectively, and the contacts 21 located at the ends of the elastic strips close to the center of the annular shape are connected to one ends of the second connecting arms 222.

Specifically, in the present embodiment, referring to FIG. 3, one contact 21 is provided at the central position of the annular shape, and the other ends of the plurality of second connecting arms 222 respectively corresponding to the plurality of elastic strips are all connected to said one contact 21, that is to say, there is one contact 21 at the center of the annular shape, which is denoted as a center contact, each elastic strip is connected with one second connecting arm 222, and in each group of correspondingly connected elastic strip and second connecting arm 222, one end of the second connecting arm 222 is connected to the elastic strip, and the other end of the second connecting arm 222 is connected to the center contact, so that the plurality of contacts 21, the first connecting arms 221 and the second connecting arms 222 form a complete structure, and as a result, the overall elasticity of the embedded member 2 is better, and the writing effect can be further improved.

Alternatively, referring to FIG. 4, the other ends of the plurality of second connecting arms 222 respectively corresponding to the plurality of elastic strips can be directly connected together, that is, one ends of the plurality of second connecting arms 222 are connected together, with the connection position approximately located at the center of the annular shape, the other ends of the second connection arms 222 are connected with the corresponding elastic strips respectively, and as a result, the integrality of the embedded member 2 also can be improved and better elasticity is ensured.

The stylus tip structure provided by the present application is directly integrally formed, so that the integrality of the stylus tip structure can be ensured, and the recovery of the stylus tip structure after being pressed can be better ensured.

Specifically, the stylus tip structure is integrally formed through an injection molding process, part of the structure can be injection-molded first, and then the injection-molded structure can be placed in a mold for secondary molding to perform the secondary molding and form an integrity, so that the embedding of the contact 21 in the stylus tip body 1 is achieved; when writing, the contacts 21 come into contact with the glass surface, and a pressure is generated, which drives the connecting arms 22 and the stylus tip body 1 to elastically deform, thereby ensuring the sufficient contact area between the stylus tip structure and the glass surface and thus ensure the electrical conductivity; meanwhile, due to the elasticity, when the pressure between the contacts 21 and the glass surface is reduced, the stylus tip structure will return to its original shape, thereby further ensuring the smoothness of writing.

The present application further provides a passive capacitive stylus (not shown in the figure), including the stylus tip structure in any of the above-mentioned embodiments.

By adopting the above-mentioned stylus tip structure, the passive capacitive stylus can achieve the same technical effect as the above-mentioned stylus tip structure, while ensuring the electrical conductivity, wear resistance and writing smoothness of the stylus tip structure of the passive capacitive stylus.

In one embodiment of the present application, considering that if the contact area between the stylus tip structure and the glass surface of the capacitive touch panel is too small, the electrical signal transmitted between them will be weakened, and if the contact area is too large, the frictional force between the stylus tip structure and the glass surface will increase and the resistance of writing will be increased, the diameter d1 of the side wall portion 13 of the stylus tip body 1 is set to be in a range of 6 mm-10 mm, such as 6 mm, 7 mm, 9 mm, 10 mm, and the like, and the diameter d2 of the portion between the end surface portion 12 and the side wall portion 13 is set to be in a range of 4 mm-6 mm, such as 4 mm, 4.5 mm, 5 mm, 5.7 mm, 6 mm, and the like, so that the contact surface formed between the stylus tip body 1 and the glass surface through the deformation of the conductive silicone during writing is approximately a circle with a diameter of 6 mm-8 mm, so as to generate a sufficient contact area, thereby better ensuring sufficient electrical signals; and meanwhile, the writing smoothness of the passive capacitive stylus can be ensured under a suitable contact area.

In an embodiment of the present application, specifically referring to FIG. 4, the portion of the contact 21 of conductive plastic contacting the glass surface is formed as a round head 211, the diameter of the round head 211 is in a range of 1 mm-1.5 mm, and the distance between two round heads 211 of adjacent two contacts 21 is in a range of 0.8 mm-1.2 mm, and also may be 1 mm, so as to ensure the amount of contacts 21 in the stylus tip structure, and ensure good electrical conductivity and writing smoothness.

In the present embodiment, the dimension of the round head 211 protruding out of the outer surface of the stylus tip body 1 is less than or equal to 0.2 mm, so that when writing, it can be ensured that both the stylus tip body 1 of conductive silicone and the contacts 21 of conductive plastic can come into contact with the glass surface, thereby ensuring sufficient contact area and further ensuring good electrical conductivity and writing smoothness.

The above are only optional embodiments of the present application, and are not intended to limit the present application. Various modifications and variations of the present application are possible for the person skilled in the art. Any modification, equivalent replacement, improvement, and the like made within the spirit and principle of the present application shall fall within the scope of the claims of the present application.

What is claimed is:

1. A stylus tip structure, comprising:
   a stylus tip body, formed as a hollow member and provided with a plurality of through holes; and
   an embedded member, comprising a plurality of contacts and connecting arms each connected to adjacent two contacts, the contacts being arranged corresponding to the through holes, the connecting arms being arranged in an inner cavity of the stylus tip body, the plurality of contacts being connected through the connecting arms to form an elastic integral structure, and a portion of each of the contacts being exposed out of the stylus tip body through the through hole.

2. The stylus tip structure according to claim 1, wherein the exposed portion of the contact at least partially protrudes out of an outer surface of the stylus tip body.

3. The stylus tip structure according to claim 1, wherein the exposed portion of the contact is at least partially coplanar with an outer surface of the stylus tip body.

4. The stylus tip structure according to claim 1, wherein the stylus tip body comprises an end surface portion and a side wall portion, each of the end surface portion and the side wall portion is provided with a plurality of the through holes.

5. The stylus tip structure according to claim 4, wherein an outer surface of the end surface portion is formed as a spherical surface, an outer surface of the side wall portion is formed as a tapered surface, the diameter of the tapered surface gradually decreases in a direction closing to the end surface portion, and the spherical surface and the tapered surface are connected in a smooth transition.

6. The stylus tip structure according to claim 5, wherein the connecting arms comprise a first connecting arm, and a plurality of contacts and a plurality of first connecting arms form a plurality of elastic strips, each elastic strip is spirally extended, and in each elastic strip, adjacent contacts are connected by the first connecting arm.

7. The stylus tip structure according to claim 6, wherein the respective elastic strips are arranged in an annular shape; the connecting arms further comprise a plurality of second connecting arms corresponding to the plurality of elastic strips respectively, and the contacts, located at one ends of the respective elastic strips close to the center of the annular shape, are connected with one ends of the respective second connecting arms.

8. The stylus tip structure according to claim 7, wherein the other ends of the plurality of the second connecting arms corresponding to the plurality of the elastic strips are directly connected together.

9. The stylus tip structure according to claim 7, wherein one contact is provided at the central position of the annular shape, and the other ends of the plurality of second connecting arms corresponding to the plurality of elastic strips are all connected to the one contact.

10. The stylus tip structure according to claim 4, wherein the diameter of the side wall portion is in a range of 6 mm-10 mm, and the diameter of a portion between the side wall portion and the end surface portion is in a range of 4 mm-6 mm, so that the diameter of the contact surface between the stylus tip body and the glass surface of a capacitive touch panel is in a range of 6 mm-8 mm.

11. The stylus tip structure according to claim 1, wherein the contact is formed as a columnar structure, and the end surface and the side surface of the columnar structure are connected transitionally by a smooth curved surface.

12. The stylus tip structure according to claim 11, wherein the end surface of the columnar structure is parallel to the outer surface of the stylus tip body where the contact is located.

13. The stylus tip structure according to claim 11, wherein the end surface and at least part of the smooth curved surface of the columnar structure are exposed out of the stylus tip body.

14. The stylus tip structure according to claim 1, wherein the stylus tip body and the contacts are made of different materials.

15. The stylus tip structure according to claim 14, wherein the stylus tip body is made of conductive silicone, and the contacts are made of conductive plastic.

16. The stylus tip structure according to claim 15, wherein a portion of the contact for contacting a glass surface is formed as a round head, the diameter of the round head is in a range of 1 mm-1.5 mm, and the distance between two round heads of adjacent two contacts is in a range of 0.8 mm-1.2 mm.

17. The stylus tip structure according to claim 16, wherein the dimension of the round head protruding out of an outer surface of the stylus tip body is less than or equal to 0.2 mm.

18. A passive capacitive stylus, comprising the stylus tip structure according to claim 1.

* * * * *